US 8,768,009 B1

(12) United States Patent
Smith

(10) Patent No.: US 8,768,009 B1
(45) Date of Patent: Jul. 1, 2014

(54) LOCATING PERSONS OF INTEREST BASED ON LICENSE PLATE RECOGNITION INFORMATION

(76) Inventor: Shawn B. Smith, Palo Alto, CA (US)

( * ) Notice: Subject to any disclaimer, the term of this patent is extended or adjusted under 35 U.S.C. 154(b) by 148 days.

(21) Appl. No.: 13/559,469

(22) Filed: Jul. 26, 2012

Related U.S. Application Data

(60) Provisional application No. 61/511,557, filed on Jul. 26, 2011.

(51) Int. Cl.
*G06K 9/00* (2006.01)
*G08G 1/01* (2006.01)

(52) U.S. Cl.
USPC .......................... 382/105; 382/274; 340/937

(58) Field of Classification Search
CPC .................................. G06K 9/00; G08G 1/01
USPC ......... 382/100, 103–107, 155, 162, 168, 173, 382/181, 193, 209, 219, 224, 232, 254, 274, 382/276, 287–291, 305, 312; 340/937; 701/1
See application file for complete search history.

(56) References Cited

U.S. PATENT DOCUMENTS

| 5,568,406 | A | | 10/1996 | Gerber |
| 5,737,710 | A | * | 4/1998 | Anthonyson ...................... 701/1 |
| 5,809,161 | A | * | 9/1998 | Auty et al. .................... 382/104 |
| 6,121,898 | A | | 9/2000 | Moetteli |
| 6,433,706 | B1 | | 8/2002 | Anderson, III et al. |
| 7,046,169 | B2 | * | 5/2006 | Bucholz et al. ............... 340/937 |
| 7,579,965 | B2 | * | 8/2009 | Bucholz ........................ 340/937 |
| 2003/0115211 | A1 | | 6/2003 | Chen et al. |

* cited by examiner

Primary Examiner — Seyed Azarian
(74) Attorney, Agent, or Firm — Spano Law Group; Joseph S. Spano

(57) ABSTRACT

Possible locations of a person of interest are ranked based on LPR instances captured around physical locations and license plate numbers associated with the person of interest. An LPR instance includes an indication of a vehicle license plate number, a physical location, and a time when the LPR instance was captured by a LPR system. A possible location of the person of interest may be a location of an LPR instance that matches the license plate number or an address location associated with the person of interest. The ranking may be based on the number of LPR visits to each location, the number of license plate number matches at each location, or an attribute of a cluster of LPR instances. In some examples, an electronic message is rapidly communicated to an entity if a target license plate number is found at a highly ranked location.

24 Claims, 14 Drawing Sheets

MEMORY 150

| PLATE # | LOCATION | TIME | |
|---|---|---|---|
| XYZ123 | 27.657912, -92.579146 | 03/12/2010, 23:14 | — 151 |
| XYZ123 | 27.557257, -92.438514 | 03/13/2010, 21:36 | — 152 |
| ⋮ | ⋮ | ⋮ | |
| NIT489 | 27.657911, -92.579145 | 03/12/2010, 23:14 | — 153 |
| RUX155 | 27.557257, -92.438515 | 03/13/2010, 21:36 | — 154 |
| RFT597 | 27.657913, -92.579147 | 03/12/2010, 23:14 | — 155 |
| ABC125 | 27.557257, -92.438515 | 03/13/2010, 21:36 | — 156 |
| ABC125 | 27.439721, -92.874349 | 03/15/2010, 08:27 | — 157 |
| RFT597 | 27.439720, -92.874350 | 03/15/2010, 08:27 | — 158 |
| ⋮ | ⋮ | ⋮ | |

MEMORY 150

| PLATE # | LOCATION | TIME | LOCATION TYPE | |
|---|---|---|---|---|
| XYZ123 | 27.657912, -92.579146 | 03/12/2010, 23:14 | INDUSTRIAL | — 151 |
| XYZ123 | 27.557257, -92.438514 | 03/13/2010, 21:36 | RETAIL | — 152 |
| ⋮ | ⋮ | ⋮ | ⋮ | |
| NIT489 | 27.657911, -92.579145 | 03/12/2010, 23:14 | INDUSTRIAL | — 153 |
| RUX155 | 27.557257, -92.438515 | 03/13/2010, 21:36 | RETAIL | — 154 |
| RFT597 | 27.657913, -92.579147 | 03/12/2010, 23:14 | INDUSTRIAL | — 155 |
| ABC125 | 27.557257, -92.438515 | 03/13/2010, 21:36 | RETAIL | — 156 |
| ABC125 | 27.439721, -92.874349 | 03/15/2010, 08:27 | APARTMENT | — 157 |
| RFT597 | 27.439720, -92.874350 | 03/15/2010, 08:27 | APARTMENT | — 158 |
| ⋮ | ⋮ | ⋮ | ⋮ | |

FIG. 3

LOCATING PERSONS OF INTEREST BASED ON LICENSE PLATE RECOGNITION INFORMATION

CROSS REFERENCE TO RELATED APPLICATION

The present application for patent claims priority under 35 U.S.C. §119 from U.S. provisional patent application Ser. No. 61/511,557, entitled "Locating Persons of Interest Based on License Plate Recognition Information," filed Jul. 26, 2011, the subject matter of which is incorporated herein by reference.

TECHNICAL FIELD

The described embodiments relate to license plate recognition systems and tools.

BACKGROUND INFORMATION

License Plate Recognition (LPR) systems are typically employed to scan and log license plate information associated with vehicles parked in publically accessible areas. A typical LPR unit performs image analysis on captured images to identify the license plate number associated with each image. A typical LPR unit generates a record for each license plate number captured. The record may include any of an optical character recognition (OCR) interpretation of the captured license plate image (e.g., output in text string object format), images of the license plate number, a perspective image of the vehicle associated with the license plate number, the date and time of image capture, and the location of the LPR unit at the time of image capture. By continuing to operate each LPR unit for prolonged periods of time over a large area, the amount of aggregated license plate identification information grows. In addition, by combining the information generated by many LPR units, an LPR system may develop a large record of LPR information.

A large record of LPR information is useable for a variety of purposes. In one example, the location of a stolen vehicle may be identified based on a database of LPR information by searching the database for instances that match the license plate number of the stolen vehicle. Based on the time and location information that matches this license plate number, law enforcement officials may be able to locate the vehicle without costly investigation.

However, it may also be useful to predict the location of a person of interest using LPR information. Current methods of prioritizing investigative work aimed at locating persons of interest are based on simple metrics (e.g., credit score or recent update of public address record). Consequently, investigative efforts are often misallocated resulting in inefficiency. Thus, improvements are desired to assist in the prioritization of investigative work associated with locating persons of interest based on LPR information.

SUMMARY

Possible locations of a person of interest are ranked based on LPR instances captured around physical locations and license plate numbers associated with the person of interest. An LPR instance includes an indication of a vehicle license plate number, a physical location, and a time when the LPR instance was captured by a LPR system. A report of the ranking is communicated to a user. Based on this report, a user can prioritize efforts made to reach the person of interest.

In some examples, the ranking may be based on the number of LPR site visits to a particular location.

In another example, the ranking may be based on the number of LPR instances within a search zone around each possible location that match a license plate number associated with the person of interest.

In another example, the ranking may be based on the average distance between each possible location and LPR instances of license plate numbers associated with the person of interest.

In some other examples, the ranking is based on attributes of clusters of LPR instances. In some examples, clusters of LPR instances are identified within a search area of a physical location over an arbitrary period of time. In some examples, the search area may be a fixed size. In some other examples, the search area may be defined progressively. For example, LPR instances may be identified in order of their distance from a geo coded physical location. The search can be stopped when a certain number of LPR instance are found. The search could also be stopped when the distance between successive LPR instances exceeds a threshold value. In some other examples, clusters of LPR in are those recognized during a LPR site visit. An LPR site visit is a period of time where an LPR unit approached a particular location, collected LPR information, and subsequently left the area.

In another aspect, an electronic message is rapidly communicated to an entity if newly scanned LPR instance matches a target license plate number found at a highly ranked location.

In yet another aspect, license plate numbers are ranked based at least in part on the number of LPR instances that match each license plate number. In some examples, the ranking of the license plate numbers is also based on the monetary value of a vehicle associated with each of the license plate numbers.

The foregoing is a summary and thus contains, by necessity, simplifications, generalizations and omissions of detail; consequently, those skilled in the art will appreciate that the summary is illustrative only and is not limiting in any way. Other aspects, inventive features, and advantages of the devices and/or processes described herein will become apparent in the non-limiting detailed description set forth herein.

BRIEF DESCRIPTION OF THE DRAWINGS

FIG. 2 is illustrative of a plurality of LPR instances 141 stored in memory 150 in one example.

FIG. 3 is illustrative of a plurality of LPR instances 141 stored in memory 150 in another example.

DETAILED DESCRIPTION

Reference will now be made in detail to background examples and some embodiments of the invention, examples of which are illustrated in the accompanying drawings.

Figure 1:
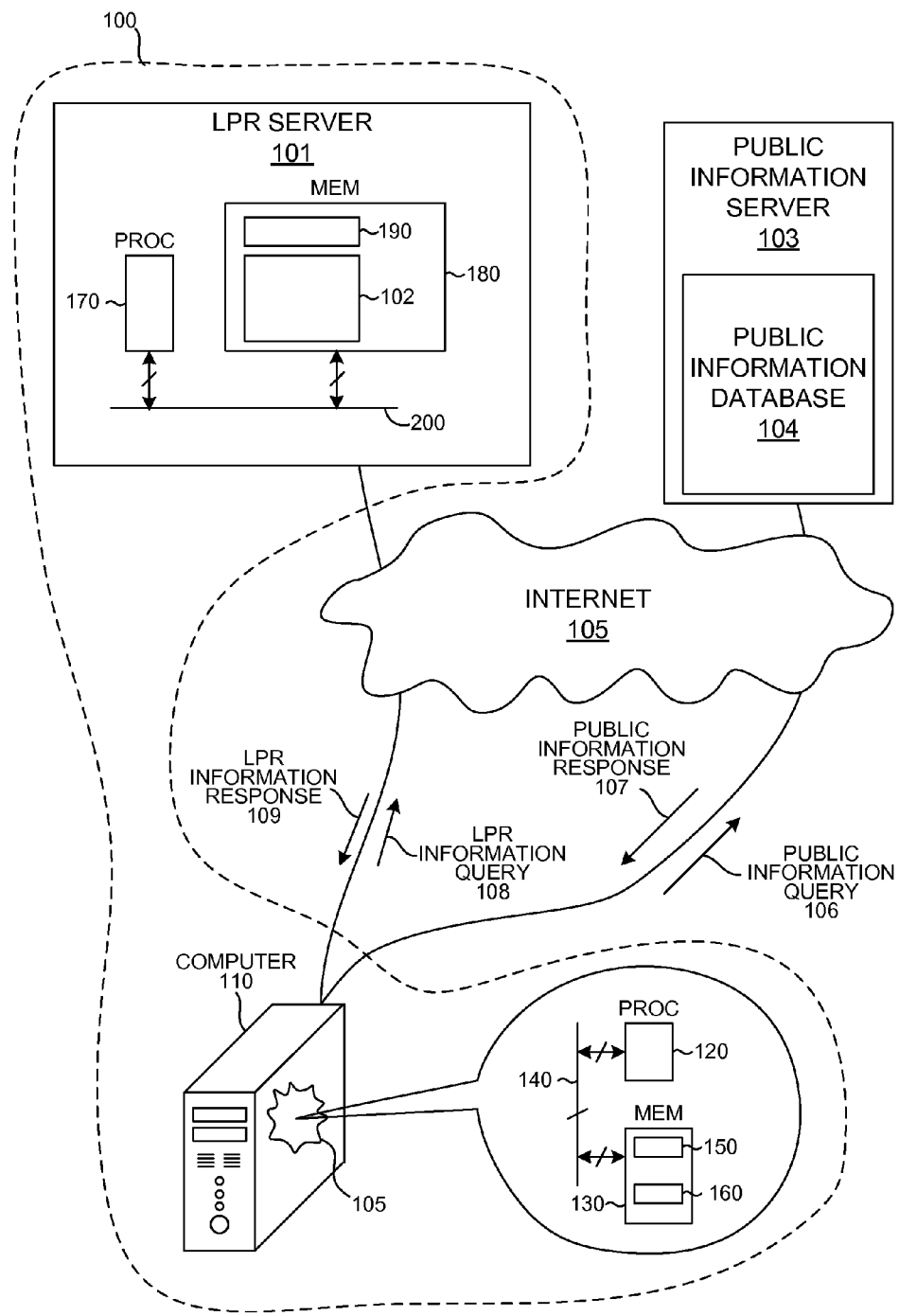
FIG. 1 is a diagram illustrative of a License Plate Recognition (LPR) system 100 in one embodiment.

FIG. 1 is a diagram illustrative of a License Plate Recognition (LPR) system 100 that includes an LPR server 101 that stores a database 102 of LPR instances and a general purpose computer 110 operable to implement tools useful to predict the location of a person of interest based on License Plate Recognition (LPR) instances.

LPR server 101 includes a processor 170 and an amount of memory 180. Processor 170 and memory 180 may communicate over bus 200. Memory 180 includes an amount of memory 190 that stores a database program executable by processor 170. Exemplary, commercially available database programs include Oracle®, Microsoft SQL Server®, IBM DB2®, etc. Memory 180 also includes an amount of memory that stores an LPR database 102 of LPR instances searchable by the database program executed by processor 170. Computer 110 includes a processor 120 and a memory 130. Processor 120 and memory 130 may communicate over bus 140. Memory 130 includes an amount of memory 150 that stores a number of LPR instances. Memory 130 also includes an amount of memory 160 that stores program code that, when executed by processor 120, causes processor 120 to implement Persons Of Interest Location Prediction and Association (POILPA) functionality by operation of POILPA tool 105.

LPR system 100 may include a camera module (not shown) that captures an image of each license plate. In some embodiments, the camera module is attached to a vehicle, or may be a handheld device operated by a person operating a vehicle. The vehicle roves through publically accessible areas capturing license plate images. LPR system 100 may also include a location module (not shown) that determines the physical location and time of each image capture. For example, the LPR system may include a global positioning system (GPS) module that determines the physical location and time of each image capture. In some other embodiments, the camera module is located in a fixed position with a view of passing vehicles (e.g., along a roadside, mounted to a traffic signal, etc.). As vehicles travel by the fixed position, the camera module captures an image of each license plate. In these embodiments, a GPS module may not be employed because the fixed position is known a priori.

LPR system 100 may perform image analysis on each collected image to identify the license plate number associated with each image. Finally, LPR system 100 stores a record of each license plate number identified, and the time and location associated with each image capture as an LPR instance in LPR database 102 stored on LPR server 101.

In the embodiment depicted in FIG. 1, computer 110 is communicatively linked to LPR server 101 via the Internet 105. However, computer 110 may be communicatively linked to LPR server 101 by any communication link known to those skilled in the art. For example, computer 110 may be communicatively linked to LPR server 101 over a local area network (LAN) or over a wireless network. Similarly, computer 110 may also be communicatively linked to a public information server 103 via the Internet 105. A public information server 103 stores a database 104 of publically available information. As used herein, publically available information includes both information that is only available to parties with a permissible purpose (e.g., law enforcement, etc.) and information that is available without restrictions on purpose of use. Examples of publically available information include vehicle registrations, information from private investigative reports, and information from public investigative reports (e.g., law enforcement profiles). Other sources of information may be contemplated (e.g., property records, birth records, death records, marriage records, etc.). By way of example, a database 104 of property records may be stored on a server 103 administered by a government entity (e.g., Alameda County, California, USA). Other databases 104 of publically available information may be stored on servers 103 administered by private organizations (e.g., LexisNexis®, accessible at www.lexisnexis.com, TLO®, accessible at www.tlo.com, etc.). Some public information servers 103 are accessible to the public without a fee; others require payment of a fee to become accessible.

After obtaining access privileges and a communication link to a public information server 103, POILPA tool 105 executed on computer 110 is able to request and receive information from a public information server 103. By way of non-limiting example, POILPA tool 105 may generate a public information query 106 that is transmitted from computer 110 to public information server 103. For example, public information query 106 may include a request to search public information database 104 for a property record associated with a property located at 123 Elm Street, Livermore, Calif., USA). A database query such as public information query 106 may be any format known to those skilled in the art (e.g., HTML script, PERL script, XML script, etc.). After searching public information database 104 in accordance with the public information query 106, a public information response 107 is communicated from public information server 103 to computer 110. Public information response 107 may include the desired search results in any format known to those skilled in the art (e.g., HTML, XML, ASCII, etc.). For example, public information query 106 may include ownership information, tax information, loan information, and transaction information associated with the property at 123 Elm Street, Livermore, Calif., USA.

In one aspect, LPR information query 108 includes an indication of a physical location and a license plate number associated with a person of interest, and in response, LPR server 101 communicates LPR information response 109 that includes LPR instances stored in LPR database 102 based on the physical location.

In one example, LPR server 101 is able to receive an LPR information query 108 from computer 110 including an indication of a physical location and a license plate number associated with a person of interest. In one example, LPR information query 108 indicates a geo coded location corresponding to a physical location and a license plate number. For example, LPR information query 108 indicates the GPS coordinates of a property at 123 Elm Street, Livermore, Calif., U.S.A. LPR server 101 determines a list of LPR instances 141 located within a search area around the physical location in response to the LPR information query 108. In some examples, LPR server 101 determines whether any of the LPR instances 141 match the license plate number associated with the person of interest. LPR server 101 transmits the list of LPR instances to computer 110 as part of LPR information response 109. In some examples, LPR server 101 indicates whether any of the LPR instances 141 match the license plate number associated with the person of interest as part of LPR information response 109.

In some examples, a search area may be a circle of fixed radius (e.g., one mile) centered on the physical location. In other examples, the search area may be defined progressively. For example, LPR server 101 may search for LPR instances in order of their distance from the geo coded physical location. The search may be stopped when a certain number of LPR instance are found (e.g., find the one hundred LPR instances closest to the geo coded physical location). The search could also be stopped when the distance between successive LPR instances exceeds a threshold value (e.g., stop search when the next furthest LPR instance is further from the previous one by more than the threshold value). In one example, the threshold value could be a multiple (e.g., three times) the average distance between the previously identified LPR instances. Other threshold values may be contemplated (e.g., fixed values, a multiple of the average distance of the previously identified LPR instances to the physical location, etc.). This may be advantageous to flexibly adjust for different areas where cars are relatively densely packed or sparsely packed.

In another example, LPR information query 108 indicates three or more geo coded locations that define a search area (e.g., a polygon defined by a group of geo coded points). In response, LPR database 102 determines a list of LPR instances 141 located within the search area.

In yet another example, LPR information query 108 indicates a named location that corresponds to a search area (e.g., a city name indicates a search area corresponding to the area of the city, a county name indicates a search area corresponding to the area of the county, etc). In response, LPR database 102 determines a list of LPR instances 141 located within the search area corresponding to the named location.

In some other examples, LPR information query 108 includes an indication of a physical location and at least one license plate number. In response, LPR server 101 determines LPR instances stored in LPR database 102 that match the at least one license plate number and are within a search area about the physical location. LPR server 101 communicates these results as part of LPR information response 109.

LPR database 102 is searchable based on the indication of a search area communicated by LPR information query 108. For example, if LPR information query 108 communicates an indication of a search area by a county name (e.g., Alameda County, California, USA), then LPR database 102 is searchable by county. In some embodiments, LPR database 102 is indexed for efficient search by tools available with commercially available database software packages (e.g., Oracle®, Microsoft SQL Server®, IBM DB2®, etc.). In this manner, LPR database 102 is configured to be efficiently searched by the desired search area communicated by LPR information query 108.

LPR information query 108 may be any format known to those skilled in the art (e.g., HTML script, PERL script, XML script, etc.). LPR server 101 communicates the list of LPR instances 141 to computer 110. LPR information response 109 may include the search results in any format known to those skilled in the art (e.g., HTML, XML, ASCII, etc.).

Computer 110 executing POILPA tool 105 is able to receive public information responses 107 and LPR information responses 109 and store the information in memory 150. This information is accessible by POILPA tool 105 for further analysis. In one example, POILPA tool 105 parses the received information and generates a Microsoft Excel® spreadsheet that presents the received information in an organized manner (e.g., tables with headings, plots, charts, etc.). In one example, POILPA tool 105 includes Microsoft Excel® scripts that perform additional analysis and present results to a user in accordance with the methods described herein.

FIG. 2 is illustrative of a plurality of LPR instances 141 stored in memory 150. An LPR instance includes an indication of the particular vehicle license plate number recognized by an LPR system 100 at a particular location and time. In the example illustrated in FIG. 2, LPR instances 151-158 each record an indication of the recognized vehicle license plate number, an indication of the location where the plate was recognized, and an indication. of the time that the plate was recognized. In other examples, additional information may be stored with any LPR instance. For example, an index identifier may be as with each LPR instance. The index identifier may be useful to facilitate sorting and organizing the plurality of LPR instances. In another example, an amount of image data indicating a visual image of the vehicle that includes the vehicle license plate may be associated with each LPR instance. This may be useful to allow a human to visually confirm the license plate number recognized by the LPR system. In another example, an identifier of the type of property at the location of the LPR instance may be appended to an LPR instance. For example, as illustrated in FIG. 3, the location type may be annotated for each LPR instance (e.g., single family residence, apartment, retail, industrial, public, commercial, place of employment, etc.). The location types indicated in FIG. 3 are provided by way of example. Other location types may be contemplated and different levels of location type may also be contemplated. For example, a "commercial" property may be distinguished from a "residential" property at one level. But, at a more detailed level, "commercial" may be further categorized, by way of example, into "retail," "heavy industrial," "light industrial," etc. Similarly, "residential" may be further categorized, by way of example, into "single family residence," "duplex," "multi-family residence," etc.

As illustrated in FIG. 2, LPR instance 151 indicates that a license plate number "XYZ123" was recognized by LPR system 100 at the location given by GPS coordinates "27.657912-92.579146" at 11:14 pm on Mar. 12, 2010. LPR instance 152 indicates that the same license plate number was recognized by LPR system 100 at a different location and time. LPR instance 153 indicates that a license plate number "ABC125" was recognized by LPR system 100 at approximately the same location as LPR instance 151 at approximately the same time. LPR instance 154 indicates that a license plate number "RUX155" was recognized by LPR system 100 at approximately the same location as LPR instance 152 at approximately the same time.

In another aspect, the relative likelihood of locating a person of interest at a particular location among a number of possible locations at a future point in time is determined based on LPR information.

In one example, the relative likelihood of locating the person of interest is based on any of past LPR instances of a vehicle associated with the person of interest and address locations associated with the person of interest.

Figure 4:
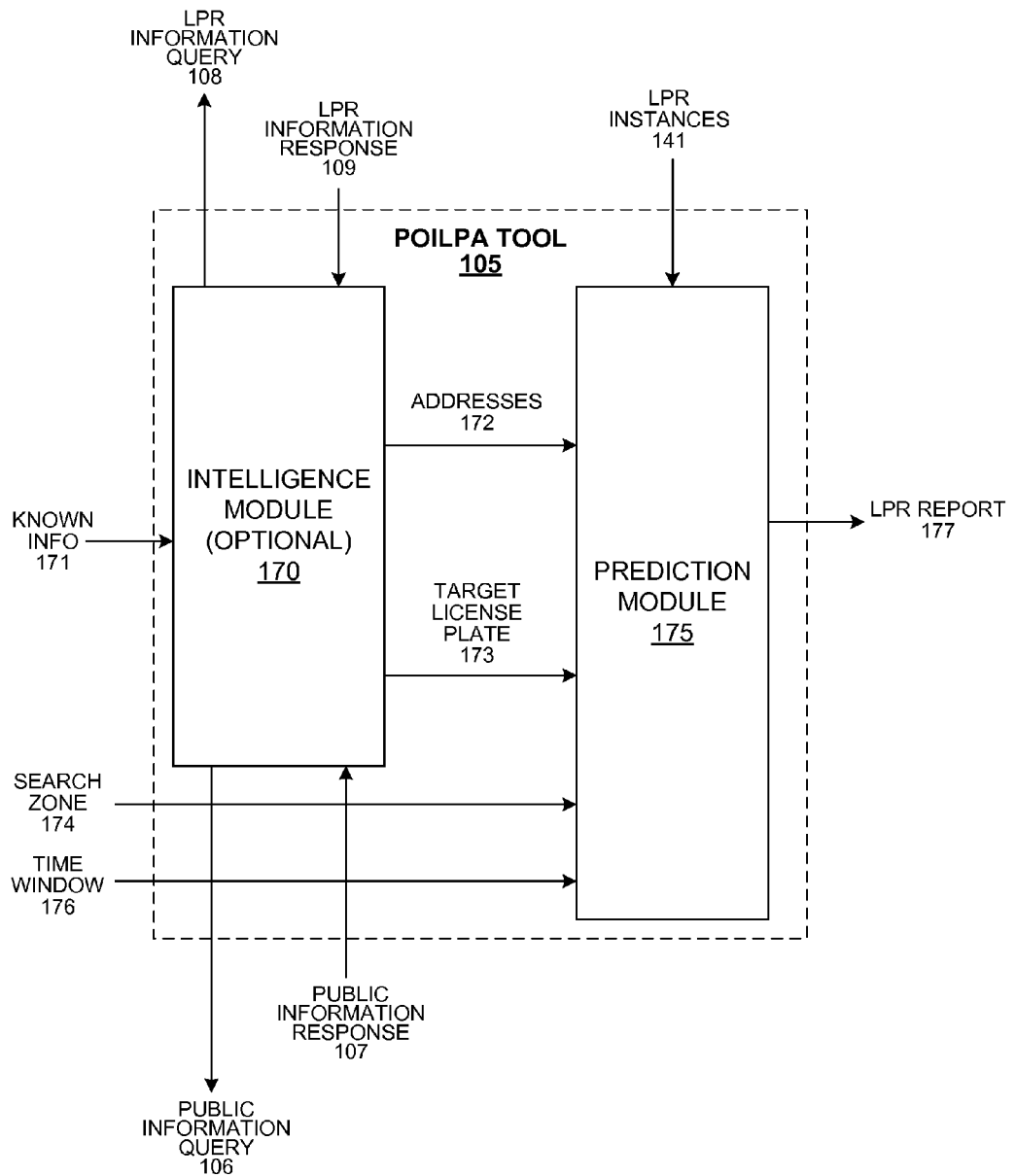
FIG. 4 is illustrative of a POILPA tool 105 operable to rank possible locations of a person of interest based on LPR instances.

FIG. 4 is illustrative of a POILPA tool 105 operable in accordance with methods illustrated in FIGS. 5, 8-9, and 11-16.

The following illustrations and corresponding explanations are provided by way of example as many other exemplary operational scenarios may be contemplated.

In the embodiment depicted in FIG. 4, POILPA tool 105 includes an intelligence module 170 and a prediction module 175, in the depicted embodiment, a user provides known information 171 about a subject of interest, and in response, POILPA tool 105 generates an LPR report 177 that communicates LPR information generated by any of the methods described herein. As depicted, intelligence module 170 generates a list of addresses 172 and target license plate numbers 173 associated with the person of interest. In some examples, addresses 172 and license plate numbers 173 may include addresses and license plate numbers directly associated with the person of interest. In some other examples, addresses 172 and license plate numbers 173 may include addresses and license plate numbers indirectly associated with the person of interest (e.g., addresses and license plate numbers directly associated with friends, relatives, and acquaintances of the person of interest). Based on the addresses 172 and target license plate numbers 173, prediction module 175 executes POILPA functionality in accordance with any of the methods described with reference to FIGS. 5, 8-9, and 11-16.

In some embodiments, POILPA tool 105 may not include intelligence module 170. In these embodiments, a user may directly provide addresses 172 and target license plate numbers 173 associated with the person of interest. Based on this information, POILPA tool 105 generates an LPR report 177 that communicates the relative likelihood of locating a person of interest at various locations without employing intelligence module 170.

Figure 5:
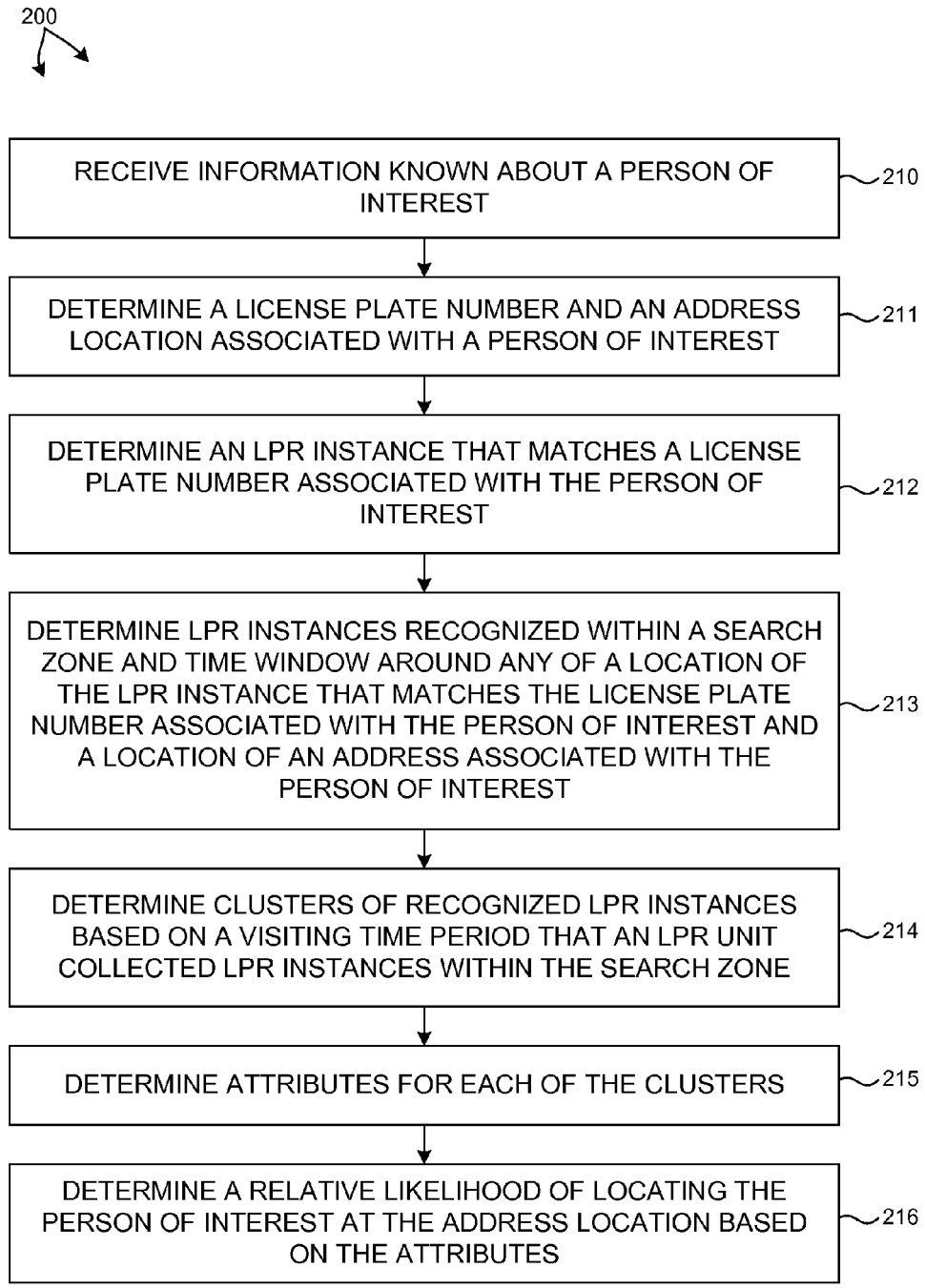
FIG. 5 is illustrative of a flowchart of a method 200 of ranking possible locations of a person of interest based on LPR instances.

FIG. 5 illustrates an exemplary method 200 of determining the relative likelihood of locating a person of interest at a particular location at a future point in time based on LPR information. In one example of block 210 of method 200, intelligence module 170 receives known information 171 about a person of interest from a user of POILPA tool 105. Known information 171 may also include information known about persons associated with the person of interest. By way of example, known information 171 may include a social security number, a driver's license number, a vehicle identification number (VIN) of a vehicle associated with the person of interest, and at least one license plate number of at least one vehicle, associated with the person of interest. Other types of known information 171 may be contemplated. For example, the name of the person of interest, their date of birth, name of a city where the person of interest once lived, an address where the person of interest may have once been located may all be provided as is to intelligence module 170. In some examples, known information 171 may be received by POILPA tool 105 as a batch file. In other examples, known information 171 may be received by POILPA tool 105 based on user responses to a query offered by POILPA tool 105 (e.g., data entry into a dialog box of a graphical user interface of POILPA tool 105). POILPA tool 105 receives the known information 171 stores this information in memory 150.

In one example of block 211, intelligence module 170 determines at least one license plate number, and optionally, at least one address associated with the person of interest. In many examples, a number of license plate numbers and addresses may be determined by intelligence module 170 based on known information 171. In one embodiment, intelligence module 170 may include information derived from a variety of sources. For example, intelligence module 170 may include information from a vehicle registry administered by the government (e.g., California Department of Motor Vehicles), information from private investigative reports, and information from public investigative reports (e.g., law enforcement profiles). Other sources of information may be contemplated. For example, property records, birth records, death records, and marriage records may all be information included in intelligence module 170. In one example, intelligence module 170 receives a vehicle identification number (VIN) of a vehicle, associated with the person of interest. By searching vehicle registry information, intelligence module 170 determines a current address of the registered owner of vehicle and the current license plate number associated with the vehicle. In another example, intelligence module 170 receives a social security number of a person of interest. By searching public investigative reports, intelligence module 170 determines a list of license plate numbers and addresses associated with the person of interest. Other examples may be contemplated.

In some examples, intelligence module 170 gathers information from an LPR database 102 and a public information database 104 to determine at least one license plate number and at least one address associated with the person of interest. For example, intelligence module 170 may communicate a public information query 106 to a public information server 103 that includes a database 104 of vehicle registry information administered by the government (e.g., California Department of Motor Vehicles). Query 106 may request vehicle information associated with a license plate number received from a user as part of known information 171. Public information response 107 may include the name of the registered owner of a vehicle registered with the license plate number. Intelligence module 170 may then communicate another query 106 to a server 103 that includes a database of property records requesting information about property owned by the registered owner of the vehicle. A response 107 may include address information of a property owned by the registered owner of the vehicle. In this manner, intelligence module determines an address associated with a person of interest.

In addition or alternatively, intelligence module 170 may communicate a LPR information query 108 to an LPR server 101 requesting a report of all LPR instances that involve a license plate number received from a user as part of known information 171. In response LPR server 101 communicates LPR information response 109 that includes a list of LPR instances that involve the license plate number and the addresses associated. with each LPR instance. In this manner, intelligence module determines an address associated with a person of interest. These examples are presented for illustrative purposes and are not limiting. Other information sources may be communicatively coupled to computer 110 and POILPA tool 105 may communicate queries for information and receive responses from these sources to determine a license plate number and address of a person of interest. For example, information from private investigative reports and information from public investigative reports (e.g., law enforcement profiles) property records, birth records, death records, and marriage records, etc. may be accessed from a number of databases 104. Additional sources of information may be contemplated.

Figure 6:
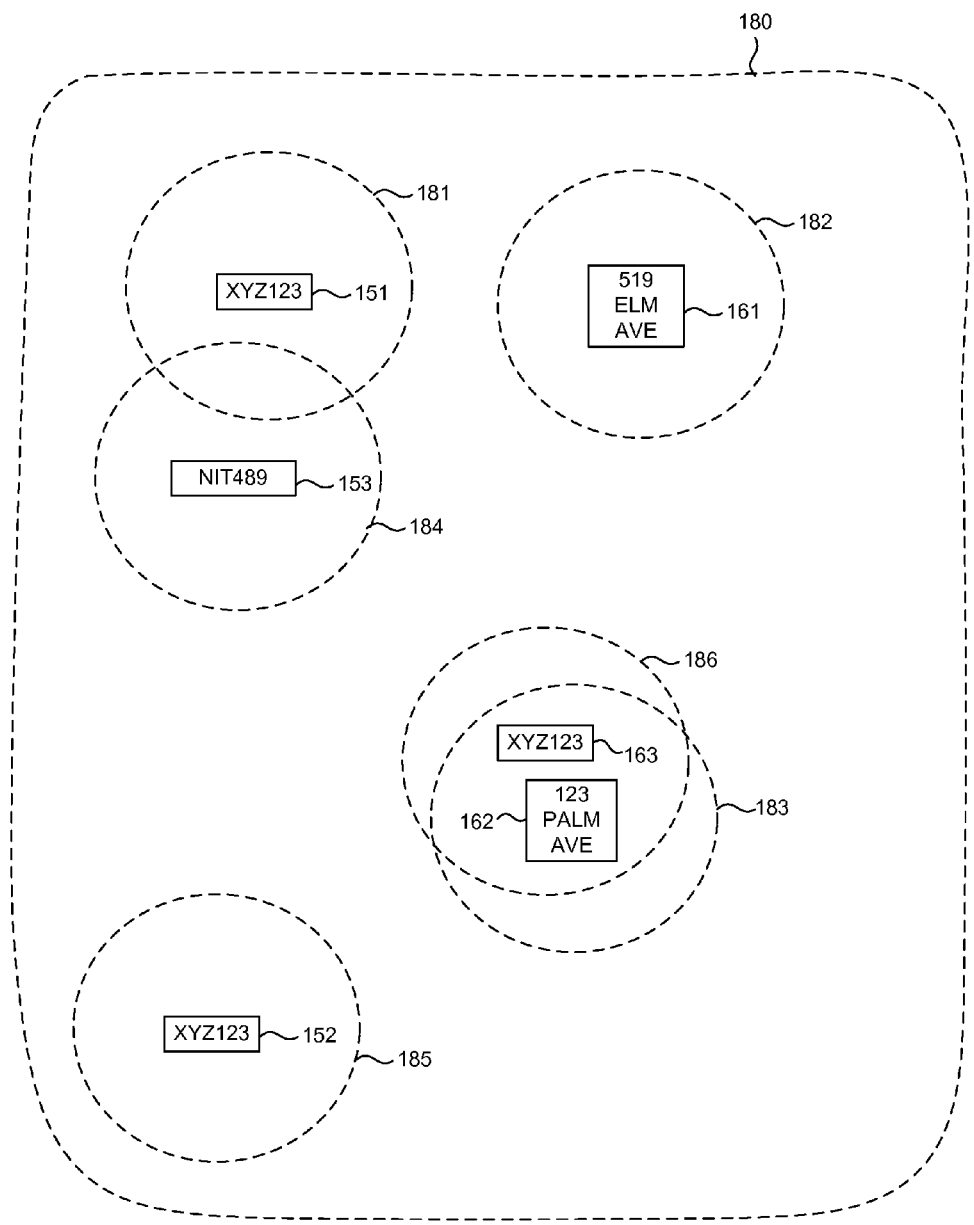
FIG. 6 is illustrative of an exemplary operational scenario of POILPA tool 105 in accordance with method 200 illustrated in FIG. 5.

The addresses 172 and target license plate numbers 173 are made available to prediction module 175. For example, as illustrated in FIG. 6, license plate numbers "XYZ123" and "NIT489" are either directly or indirectly associated with a person of interest. In addition, addresses 161 and 162 are either directly or indirectly associated with a person of interest. The locations of these addresses and any LPR instances of these license plate numbers may be used as a basis for further analysis as described herein.

In one example of block 212 of method 200, prediction module 175 determines a list of LPR instances that match a license plate number 173 associated with the person of interest. The location of each of these LPR instances is determined and stored as a possible location of the person of interest. For example, as illustrated in FIG. 6, LPR instances 151, 152, and 163 match license plate number "XYZ123" as with a person of interest. The locations of these instances may be used as a basis for further analysis as described herein.

In one example of block 213 of method 200, prediction module 175 determines a list of LPR instances recognized within a search zone and time window around any of the addresses 173 associated with the person of interest and the locations identified in block 212. For example, each address (e.g., addresses 161 and 162) is geo-coded to a Global Positioning System (GPS) point. Prediction module 175 searches through LPR instances 141 for LPR instances that are within a search zone of the address location (e.g., search zones 182 and 183 around addresses 161 and 162, respectively). In addition, prediction module 175 searches through LPR instances 141 for LPR instances that are within a search zone of the locations or LPR instances that match a license plate number associated with a person of interest (e.g., search zones 181, 184, 185, and 186 around LPR instances 151, 153, 152, and 163). In some examples, the size of the search zone may be pre determined by prediction module 175. In other examples, the size of the search zone 174 may be received from a user of POILPA tool 105. In this manner, a user may adjust the search results by changing the size of the search zone based on the user's experience. In some examples, a time window 176 may be received from the user to further limit the search results. For example, a user may restrict tine search to LPR instances within the past two years to limit the search results to relatively recent potential locations of the person of interest.

FIG. 6 illustrates a search area 180 that includes LPR information gleaned from a LPR database. In some examples, search area 180 is the entire area circumscribed by all of the LPR instances within the LPR database. However, in some embodiments it is desireable to reduce the size of search area 180 to a subset of LPR instances available in an LPR database to focus in on specific areas and reduce computational effort. Search area 180 may include specific geographic areas (e.g., the state of California, the county of Santa Clara, the city of San Jose, etc.). Specific areas may also include specific demographic categories (e.g., areas designated by particular industry codes or area codes). For example, specific demographic categories may identify the use of a particular area (e.g., public, private, commercial, university, government, military, etc.). In some examples, Geographic Information System (GIS) Point of Interest (POI) polygon files may be used to filter LPR information available in an LPR database to arrive at a subset of LPR instances for further analysis. For example GIS POI Standard Industry Codes (SIC) may be employed to filter LPR instances within an LPR database.

In one example of block 214 of method 200, prediction module 175 determines clusters of LPR instances within a search area around a possible location of a person of interest. In some examples, prediction module 175 determines clusters of LPR instances within a search area of a physical location over an arbitrary period of time. In some examples, the search area may be a circle of fixed radius (e.g., one mile) centered on the physical location. In other examples, the search area may be defined progressively. For example, prediction tool 175 can search for LPR instances in order of their distance from the geo coded physical location. The search can be stopped when a certain number of LPR instance are found (e.g., find the one hundred LPR instances closest to the geo coded physical location). The search could also be stopped when the distance between successive LPR instances exceeds a threshold value (e.g., stop search when the next furthest LPR instance is further from the previous one by more than the threshold value). In one example, the threshold value could be determined as a multiple of the average distance between the previously identified LPR instances. Other threshold values may be contemplated (e.g., fixed values, a multiple of the average distance of the previously identified LPR instances to the physical location, etc.). This may be advantageous to flexibly adjust for different areas where cars are relatively densely packed or sparsely packed.

In another example, prediction module 175 determines clusters of LPR instances within a search area that were recognized during a LPR site visit. An LPR site visit is a period of time where an LPR unit approached a particular location, collected LPR information, and subsequently left the area. For example, an LPR unit may first visit an apartment complex that is within the search zone between 4:30 pm and 4:45 pm on Jan. 10, 2009. During this visiting time period, the LPR unit scans the license plates of many vehicles parked in and around the apartment complex. The LPR instances generated during this visiting time period are grouped into a cluster by prediction tool 175 because all of these LPR instances were gathered over a relatively short period of time (e.g., the visiting time period of the LPR unit). A few weeks later, the LPR unit may revisit the apartment complex between 2:30 pm and 3:00 pm on Mar. 4, 2009. Again, during this period of time, the LPR unit can the license plates of many vehicles parked in and around the apartment complex. The LPR instances generated during this period of time are grouped into another cluster by prediction tool 175 because all of these LPR instances were gathered over a different visiting time period. Clusters may be determined based on groups of LPR instances recognized at each visit of a search zone that includes an address location or license plate location associated with the person of interest.

In some examples, prediction tool 175 determines clusters of LPR instances by analyzing the time stamps of each LPR instance of a group of LPR instances recognized within a search zone of a particular address. In one example, prediction tool 175 arranges a group of LPR instances within a search zone of a particular address in chronological order. Prediction tool then steps through the chronologically ordered list and determines the time difference between successive LPR instances based on their respective time stamps. If the time difference between successive LPR instances is less than a predetermined threshold, then the prediction module 175 groups these two LPR instances in the same cluster. If the time difference between successive LPR instances is greater than a predetermined threshold, the successive LPR instances are separated into different clusters. The predetermined threshold value may be assigned automatically by prediction tool 175 or received from a user. In one example, the predetermined threshold value is five minutes; however, other values may be contemplated.

In one example of block 215 of method 200, prediction module 175 determines attributes for each of the clusters of LPR instances that are useful for further classification. Example attributes include: duration of the visit, number of LPR instances in the cluster, whether an LPR instance within the cluster includes a license plate number associated with the person of interest, whether an LPR instance within the cluster does not include a license plate number associated with the person of interest, date and time of visiting time period, whether the cluster location is a residence address, a place of employment, a retail business frequented by a person of interest, a traffic intersection or freeway location frequented by a person, etc.

Figure 7:
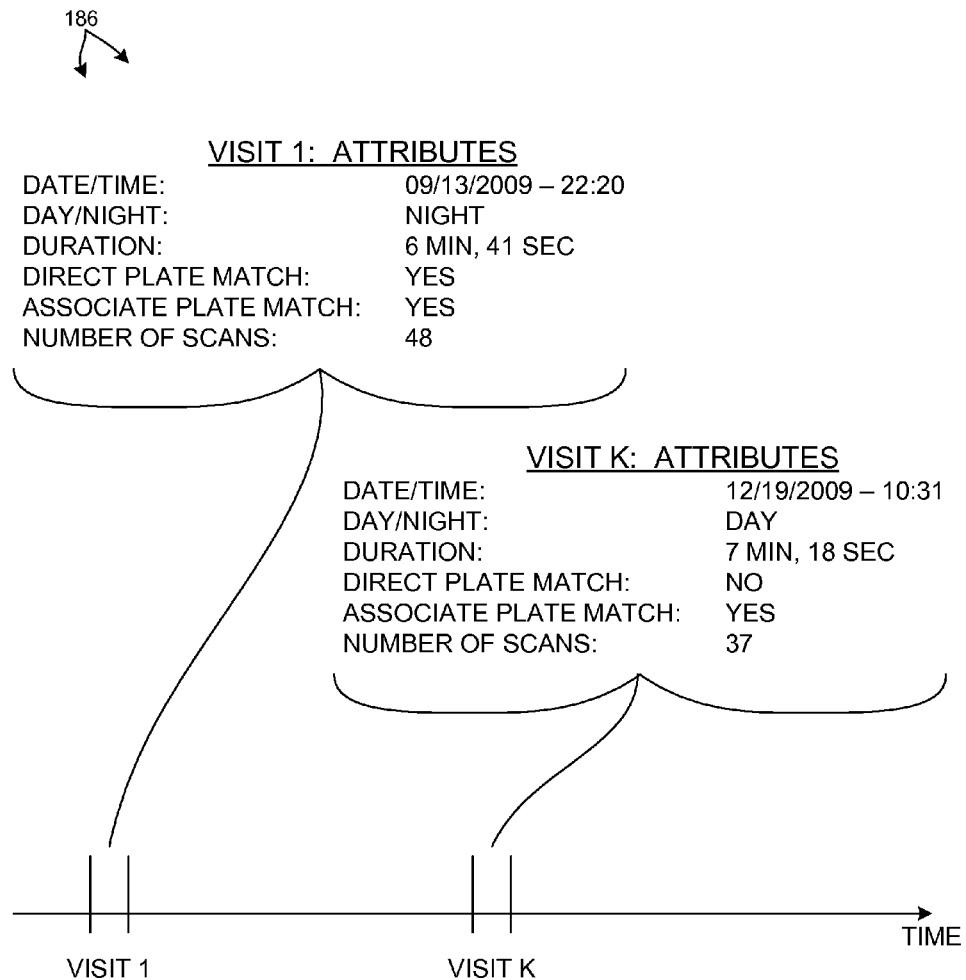
FIG. 7 is illustrative of an exemplary timeline including LPR site visits to a particular location and attributes of each LPR site visit.

FIG. 7 illustrates an exemplary timeline 186 that illustrates two different visits. As illustrated, each visit includes a list of attributes associated with each visit. For example, attributes may include the date and time of the visit, an indication of whether the visit occurred during the day or night, an indication of the duration of the visit, an indication of the number of plates scanned during the visit, an indication of whether a license plate number that matches a license plate number directly associated with the person of interest was scanned during the visit, and an indication of whether a license plate number that matches a license plate number indirectly associated with the person of interest was scanned during the visit. These attributes are listed by way of example. Many other attributes may be contemplated.

Prediction tool 175 determines an attribute of each cluster of LPR instances by analyzing the LPR information associated with each LPR instance within the cluster. By way of example, prediction tool 175 examines the license plate numbers associated with each LPR instance in a cluster and determines whether any of these numbers match one or more license plate numbers 173 associated with a person of interest. An exemplary attribute of the cluster is whether the cluster included a match with a license plate number 173 associated with the person of interest. In another example, prediction tool 175 determines the time duration of a site visit by determining the difference in time between LPR instances with the earliest and latest time stamps within a cluster. This time is another exemplary attribute of the cluster, in other examples, prediction tool 175 may determine many attributes associated with each cluster.

Prediction module 175 assigns a value to each cluster of LPR instances around different possible locations of the person of interest based on the attributes of each cluster. In this manner, attributes are useful for characterizing clusters of LPR instances so that clusters can be compared and ranked relative to each other.

In one example of block 216 of method 200, prediction module 175 determines a relative likelihood of locating the person of interest within a distance of the address location associated with the person of interest based on the attributes. For example, the apartment complex within the search zone of one of the addresses associated with the person of interest is visited ten times over a period of one year (e.g., ten clusters). From the attributes associated with each of the clusters, prediction module 175 determines that a license plate number associated with the person of interest was found three out of the ten visits (e.g., three of the ten clusters include an LPR instance of a target license plate number). Moreover, from the attributes, prediction module 175 determines that each of three sightings of the target license plate number occurred during evening hours. Based on this analysis, prediction module 175 determines that the likelihood of reaching the person of interest personally at a given point in time is 0% during the daytime, but 30% during the evening. This analysis may be performed for a number of different search zones to generate probabilities of reaching a person of interest within the search zone at a given point in time.

POILPA tool 105 communicates these probabilities to the user, for example, by generating a report (e.g., text file). An LPR report 177 includes the probabilities as with finding the person of interest within a distance of each address location. In some examples, POILPA tool 105 may rank the probabilities and generate a list of address locations (and optionally zones around each address location) and time periods where the person of interest may be reached in descending order of likelihood. In this manner, the user can prioritize efforts made to reach the person of interest. In another example, POILPA tool 105 grades each address associated with the person of interest based on the probabilities. For example, any address location and time period with a probability of reaching the person of interest greater than 20% is graded as a "GREAT" prospect, while any address location and time period with a probability of reaching the person of interest less than 1% is graded as a "POOR" prospect. Any number of grades and methods of scaling grades by the determined probabilities may be contemplated.

In some examples POILPA tool 105 communicates these probabilities to a large intelligence database that may be example, commercially available data mining software tools (e.g., data mining tools available from Oracle or IBM) or customized data mining software may operate on the large database to further prioritize investigative efforts. In these embodiments POILPA tool 105 generates an electronic data file including, for example, the probabilities associated with finding a person of interest within a distance of each address location. This file may be appended to the large database subject to additional data mining steps.

Figure 8:
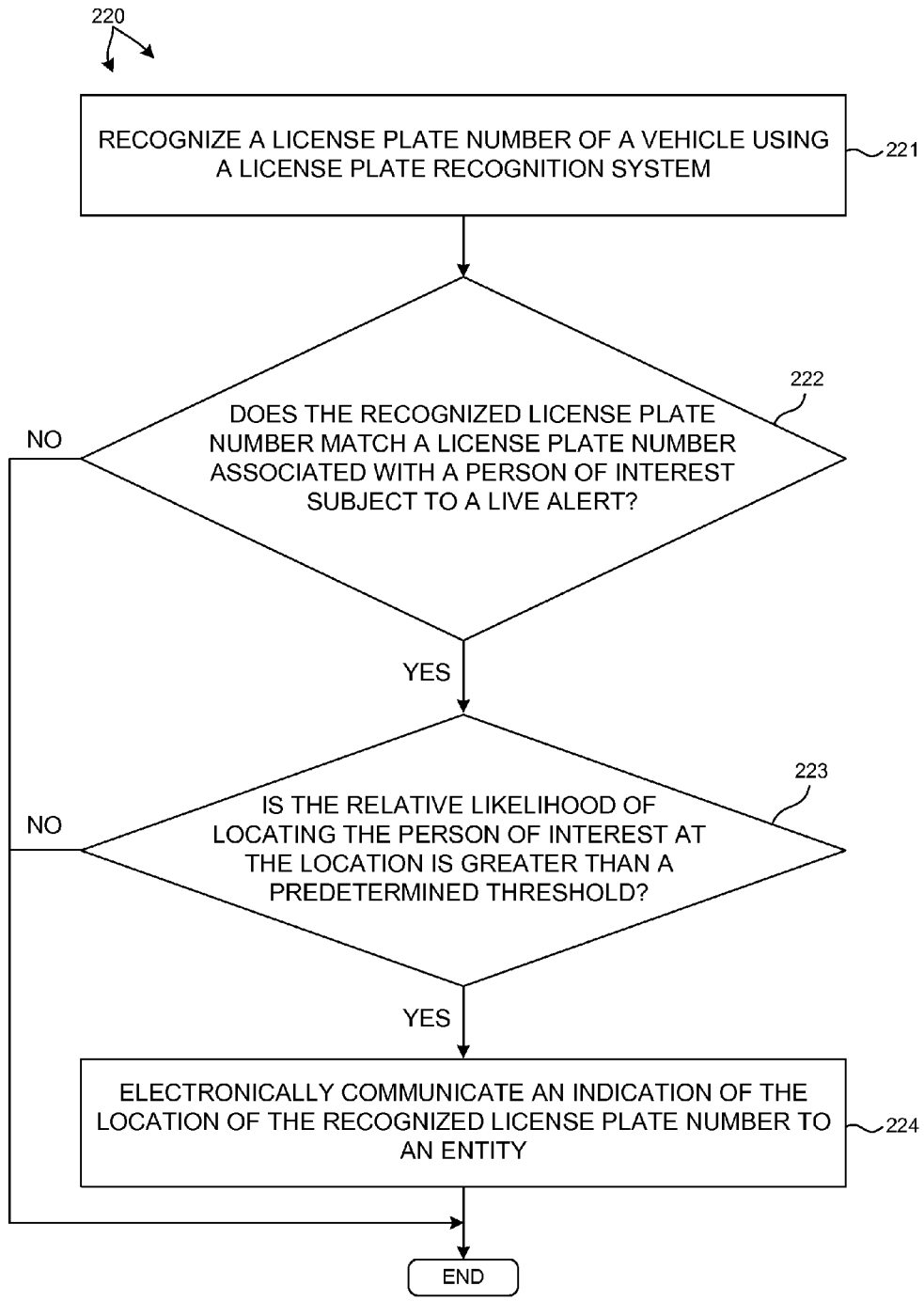
FIG. 8 is illustrative of a flowchart of a method 220 of rapidly communicating the location of a vehicle to an entity in response to an LPR system recognizing the license plate number at the location.

FIG. 8 illustrates an exemplary method 220 of rapidly communicating the location of a recent LPR instance to an entity when 1) the vehicle is associated with a person of interest; and 2) the relative likelihood of locating the person of interest at the location is greater than a predetermined threshold.

By way of non-limiting example, method 220 will be discussed with reference to the embodiment of LPR system 100 depicted in FIGS. 1 and 4. In block 221 of method 220, LPR system 100 captures a LPR instance as described herein. In block 222, LPR system 100 determines whether the recognized license plate number of the LPR instance matches a license plate number associated with a person of interest subject to a live alert. In one example, POILPA tool 105 receives input from a user indicating that a particular person of interest is the subject of a live alert. Based on this user input, POILPA tool 105 flags each license plate number associated with the person of interest as a possible trigger for a live alert. LPR system 100 compares the recognized license plate number with each flagged license plate number to determine whether a match exists. If a match exists, method 220 continues to block 223.

In block 223, LPR system 100 determines whether the relative likelihood of locating the person of interest at the location of the LPR instance is greater than a predetermined threshold. LPR system 100 may determine the relative likelihood of locating the person of interest at the location by any method or combination of methods described herein. The predetermined threshold value may be any useful value of a metric indicative of the relative likelihood of locating the person of interest. In some examples, the metric indicating the relative likelihood of locating the person of interest is the ranking of possible locations of the person of interest. In these examples, the threshold value may be a specific place in the ranking. By way of example, locations ranked in the top three of the most likely locations to find the person of interest trigger a live alert. In other examples, the metric indicating the relative likelihood of locating the person of interest is the probability of locating the person of interest at each possible location. For example, for a person of great interest, a likelihood of 10% may be high enough to trigger a live alert. In other examples involving persons of less interest, a likelihood of 75% or more may be required before a live alert is triggered. If the relative likelihood of locating the person of interest at the location of the LPR instance exceeds the predetermined threshold, method 220 continues to block 224.

In block 224, LPR system 100 electronically communicates an indication of the location of the LPR instance to an entity. Based on the live alert, an entity (e.g., law enforcement officials, debt collection agents, investigators, etc.) are rapidly alerted to the whereabouts of a person of interest within moments of recognition of the license plate number at a particular location. In response to the alert, the entity may quickly deploy to that location before the person of interest associated with the vehicle moves elsewhere. The entity to which the communication is directed is typically a person or organization (e.g., police dispatch, investigator, debt collection agency, etc.). By way of non-limiting example, the electronic communication may be in the form of an e-mail, text message, telephonic message, etc. Ideally, the communication is initiated within moments of recognizing the license plate number subject to the live alert (e.g., within a few seconds or minutes). In some examples, the time elapsed between recognizing the license plate number of the vehicle and electronically communicating the indication of the location of the recognized license plate number to the entity is less than one hour. In some other examples, the time elapsed between recognizing the license plate number of the vehicle and electronically communicating the indication of the location of the recognized license plate number to the entity is less than fifteen minutes. Other time periods may be contemplated.

Figure 9:
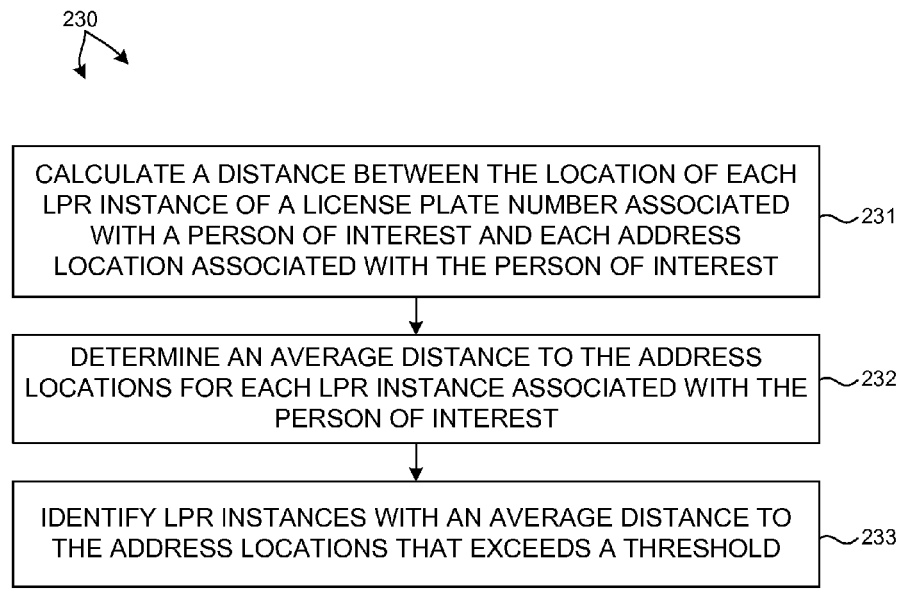
FIG. 9 is illustrative of a flowchart of a method 230 of identifying LPR instances that have a high likelihood of being recognized in error.
Figure 10:
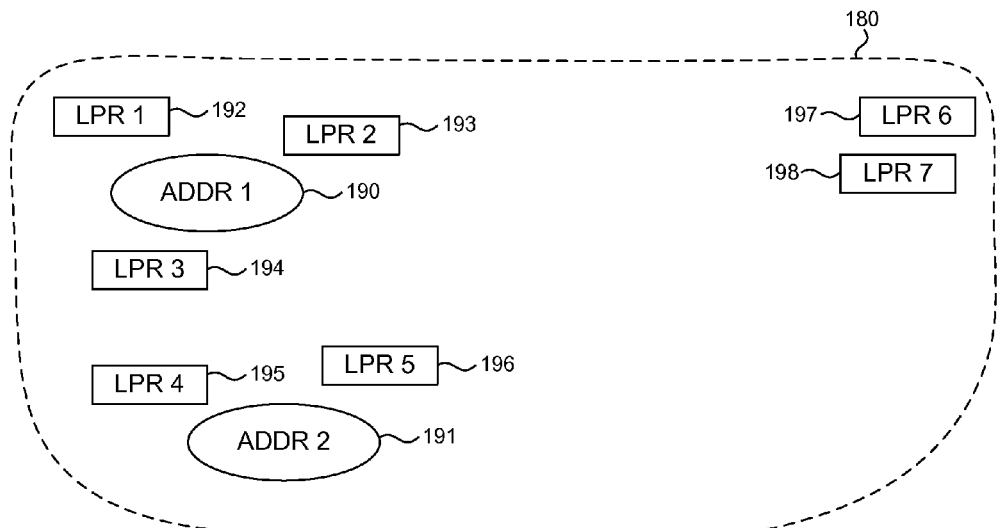
FIG. 10 is illustrative of LPR instances recognized by LPR system 100 that are associated with a person of interest within search zone 180.

FIG. 9 illustrates an exemplary method 230 of identifying LPR instances that have a high likelihood of being recognized in error. In one example of block 231 of method 230, LPR system 100 determines the distance between the location of each LPR instance of a license plate number associated with a person of interest and each address location associated with the person of interest. Based on the determined distances, an average distance between an LPR instance and each of the addresses associated with the person of interest is determined (block 232). For example, as illustrated in FIG. 10, LPR instances 192-198 are license plate numbers recognized by LPR system 100 that are associated with a person of interest within search zone 180. Addresses 190-191 are addresses associated with a person of interest. By way of example, LPR system 100 determines the distance between LPR instance 192 and each of addresses 190 and 191. LPR system 100 determines the average of these two values. Similarly, LPR system 100 determines the average distance between each of LPR instances 192-198 and addresses 190-191. Based on the determined average distances LPR system 100 identifies LPR instances that exceed a threshold distance. For example, as illustrated, LPR instances 192-196 are located close to addresses 190-191 and LPR instances 197-198 are located relatively far away. For example, LPR instances 192-196 may all be located in the San Francisco Bay Area while LPR instances 197-198 may be located in Las Vegas, Nev. A threshold average distance from addresses associated with a person of interest may be set to 100 miles. Based on this threshold, LPR instances 197 and 198 are identified by LPR system 100 as suspect and are ignored in further analyses. For example, LPR instances 197 and 198 may include a recognized license plate number that is associated with the person of interest, but the license plate may be a Nevada license plate not associated with the person of interest rather than a California license plate that is associated with the person of interest. In another example, an error in the recognition of the license plate number may lead to an LPR instance that is falsely associated with the person of interest. By identifying LPR instances that are located far away from the addresses associated with a person of interest, potentially false LPR instances may be eliminated from further consideration.

As discussed above, the threshold average distance may be a predetermined value, however, other ways to distinguish LPR instances may be considered. For example, the threshold value may be determined as a percentage of the average of all of the determined average values. In another example a standard deviation of the average values may be determined and an average value beyond a predetermined number of standard deviations may be identified for exclusion. Similarly, many other ways to distinguish LPR instances based on their distance from addresses associated with a person of interest may be considered.

In another example of method 230, LPR instances may be identified based on the number of LPR instances that match a target license plate number within a given distance of address locations associated with a person of interest. For example, based on the determined distances of block 231, a minimum distance is determined for each LPR instance. The minimum distance is the distance between the LPR instance and the address location closest to the LPR instance. The minimum distances associated with the LPR instances are compared. For example, the number of LPR instances with a minimum distance less than a given threshold (e.g., one mile) is determined. This is repeated for a number of different threshold values (e.g., 5 miles, 10 miles, 20 miles, 50 miles, etc.). In some cases, most of the minimum distances associated with the LPR instances will be clustered around a small threshold value (e.g., 10 miles). In these cases, a small number of LPR instances with relatively large minimum distance values (e.g., >50 miles) may be eliminated from further consideration. For example, if 80% of the LPR instances have a minimum distance of less than five miles and the last 20% of LPR instances have a minimum distance that is more than five times the five mile threshold value, these LPR instances are discarded. In general, if a plot of the number of LPR instances as a function of the minimum distance exhibits a clear bimodal (or multi-modal distribution), LPR instances that are located far from the address locations associated from a person of interest may be disregarded for purposes of further analysis.

Figure 11:
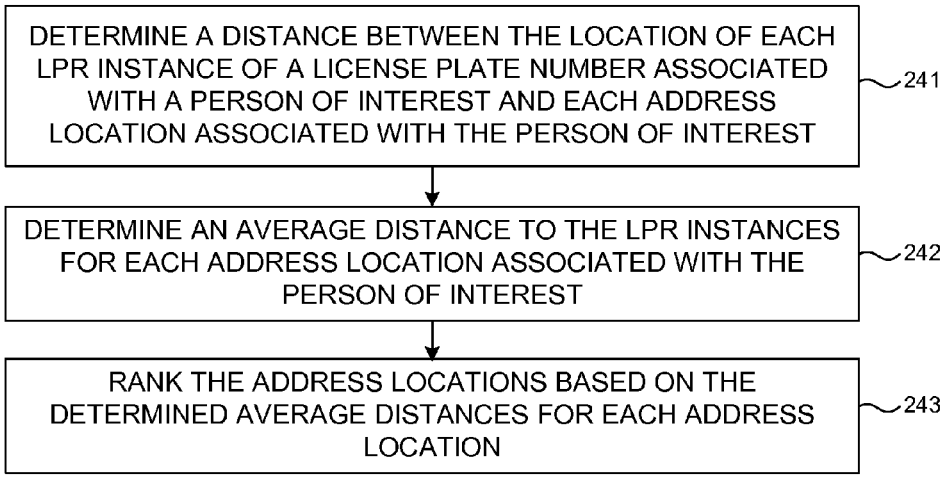
FIG. 11 is illustrative of a flowchart of a method 240 of ranking address locations associated with a person of interest based on their average distance from LPR instances of license plate numbers associated with the person of interest.

FIG. 11 illustrates an exemplary method 240 of ranking address locations associated with a person of interest based on their average distance from LPR instances of license plate numbers associated with the person of interest. In one example of block 241 of method 240, LPR system 100 determines the distance between the location of each LPR instance and each address associated with a person of interest. In one example of block 242, LPR system 100 determines an average distance between each address location and the LPR instances associated with the person of interest. Based on these average distances, LPR system 100 ranks the address locations (block 243). For example, address locations with the smallest average distance to the LPR instances is scored higher than address locations with larger average distances. In another example, address locations may be simply ordered by the average distance between each address and the LPR instances. Address locations with higher scores indicate a higher likelihood of locating a person of interest at that address location. In this manner, an LPR system can communicate to an entity (e.g., via LPR report 177) address locations with a higher likelihood of locating the person of interest based on their ranking. Based on this information, an entity can focus its investigative efforts more efficiently.

Figure 12:
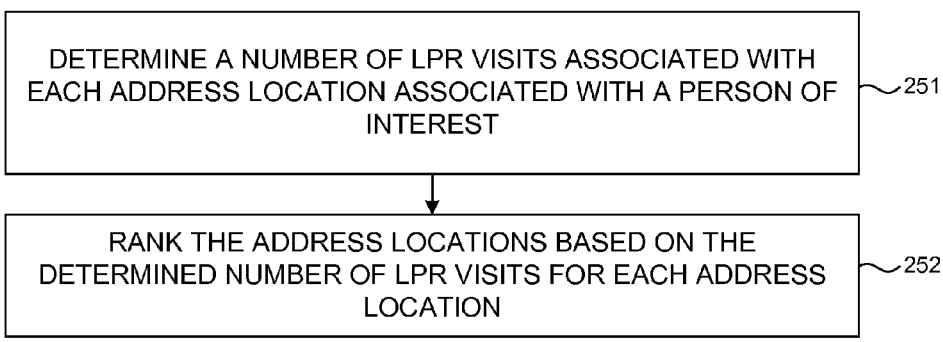
FIG. 12 is illustrative of a flowchart of a method 250 of ranking address locations associated with a person of interest based on the number of LPR visits to each address location.

FIG. 12 illustrates an exemplary method 250 of ranking address locations associated with a person of interest based on the number of LPR visits to each address location. In one example of block 251 of method 250, LPR system 100 determines the number of LPR visits that have been made to each address location associated with a person of interest. Based on the number of visits to each address location, LPR system 100 ranks the address locations (block 252). For example, address locations with the greatest number of LPR visits are scored higher than address locations with fewer LPR visits. In another example, address locations may be simply ordered by the number of LPR visits to each address location. Address locations with higher scores indicate a higher likelihood of locating a person of interest at that address location. In this manner, an LPR system can communicate to an entity (e.g., via LPR report 177) address locations with a higher likelihood of locating the person of interest based on their ranking. Based on this information, an entity can focus its investigative efforts more efficiently.

Figure 13:
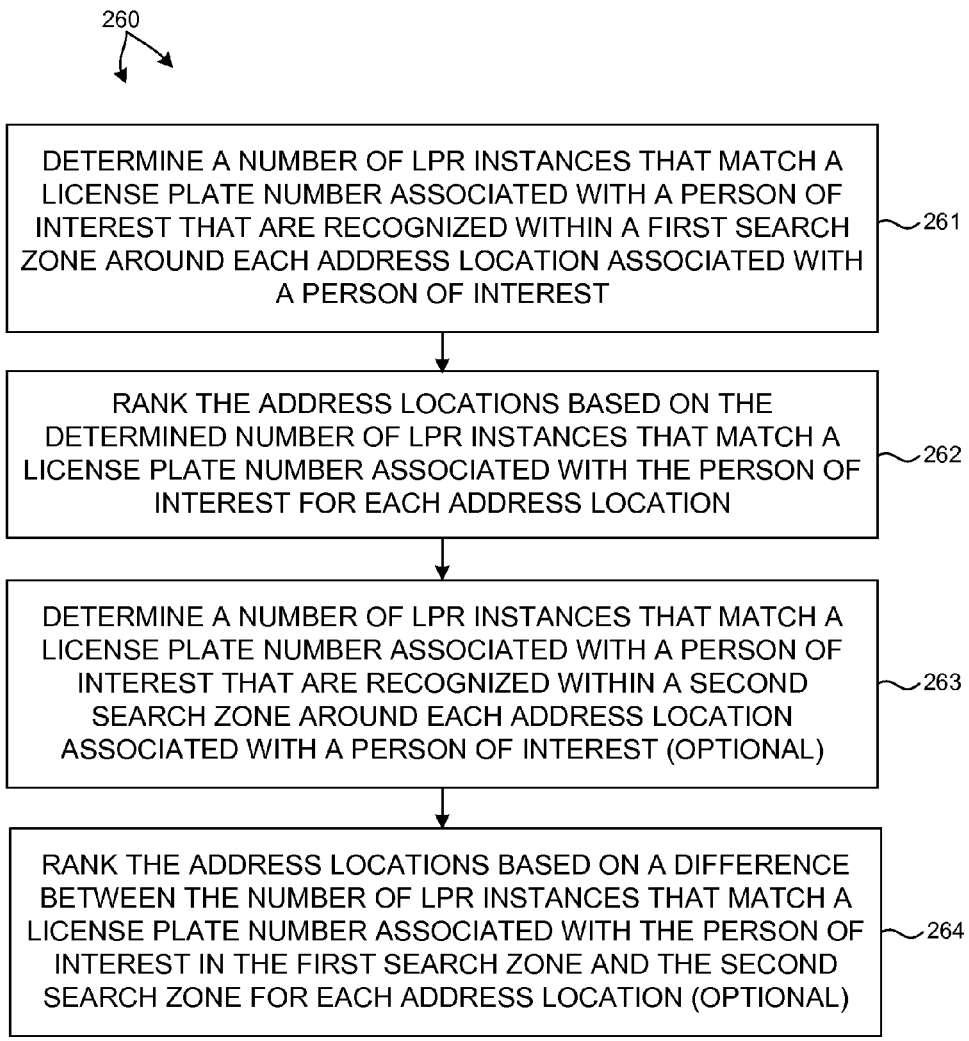
FIG. 13 is illustrative of a flowchart of a method 260 of ranking address locations associated with a person of interest based on the number of LPR instances that match a license plate number associated with a person of interest.

FIG. 13 illustrates an exemplary method 260 of ranking address locations associated with a person of interest based on the number of LPR instances that match a license plate number associated with a person of interest found within a search zone of the address location. In one example of block 261 of method 260, LPR system 100 determines the number of LPR instances that match a license plate number associated with the person of interest within a search zone of each address location associated with the person of interest. In some examples, the search zone may be a predetermined size (e.g., one mile around an address location). In some other examples, the size of the search zone may be dynamically determined such that a particular number of LPR instances are recognized within the search zone (e.g., size of search zone is such that 100 LPR instances are located in the search zone). In some other examples, the search zone may be determined by a particular area (e.g., GIS POI polygon) associated with the address location.

Based on the determined number of LPR instances that match a license plate number associated with the person of interest for each address location, LPR system 100 ranks the address locations (block 262). For example, address locations with the greatest number of LPR instances are scored higher than address locations with fewer LPR instances. In another example, address locations may be simply ordered based on the number of LPR instances. In yet another example, the number of matching LPR instances in a particular search zone about a particular address location may be expressed as a percentage of the total number of matching LPR instances in a particular time window or large area search zone. Address locations are ranked based on their percentage of the total number of matching LPR instances. Address locations with higher scores indicate a higher likelihood of locating a person of interest at that address location. In this manner, an LPR system can communicate to an entity (e.g., via LPR report 177) address locations with a higher likelihood of locating the person of interest based on their ranking. Based on this information, an entity can focus its investigative efforts more efficiently.

In addition, address locations may be ranked based on LPR instances determined from a number of cumulative search zones around each address location. In one example of optional block 263, LPR system 100 determines the number of LPR instances that match a license plate number associated with the person of interest within a second search zone of each address location associated with the person of interest. For example, the second search zone may be larger than the first search zone. In this manner, additional matching LPR instances may be found within the larger search zone. LPR system 100 ranks the address locations based on the difference between the determined number of LPR instances for both search zones for each address location, (block 264). For example, if a larger search zone about an address location yielded no new LPR instances, the address location may be scored lower (e.g., indicating that the address was a transient stop). However, an address location that yielded a number of new LPR instances for a larger search zone may be scored higher (e.g., indicating that the address is a permanent location of the person of interest). In some other examples, additional search zones around each address location may be contemplated. For example, three or more search zones may be analyzed in accordance with method 260.

In addition, LPR system 100 may score each search zone for each address location based on the size of the search zone. For example, larger search zones may be scored with less emphasis compared to smaller search zones. In this manner, address locations with a number of matching LPR instances within a small search zone will be ranked higher than address locations with the same number of matching LPR instances over a larger search zone.

In another example, LPR system 100 may score each address location based on an estimate of a monetary value associated with a property at the address location. For example, computer 110 may access a public information database 104 that includes estimates for property values (e.g., Zillow.com®). In this manner, the ranking of possible locations of a person of interest is based at least in part on the monetary value of the property at the address location.

As discussed herein, methods 240, 250, and 260 rank address locations in different ways. However, address locations may also be ranked by aggregating the rankings associated with any of methods 240, 250, and 260. For example each ranking associated with methods 240, 250, and 260 may be weighted to generate a composite ranking for each address location.

Figure 14:
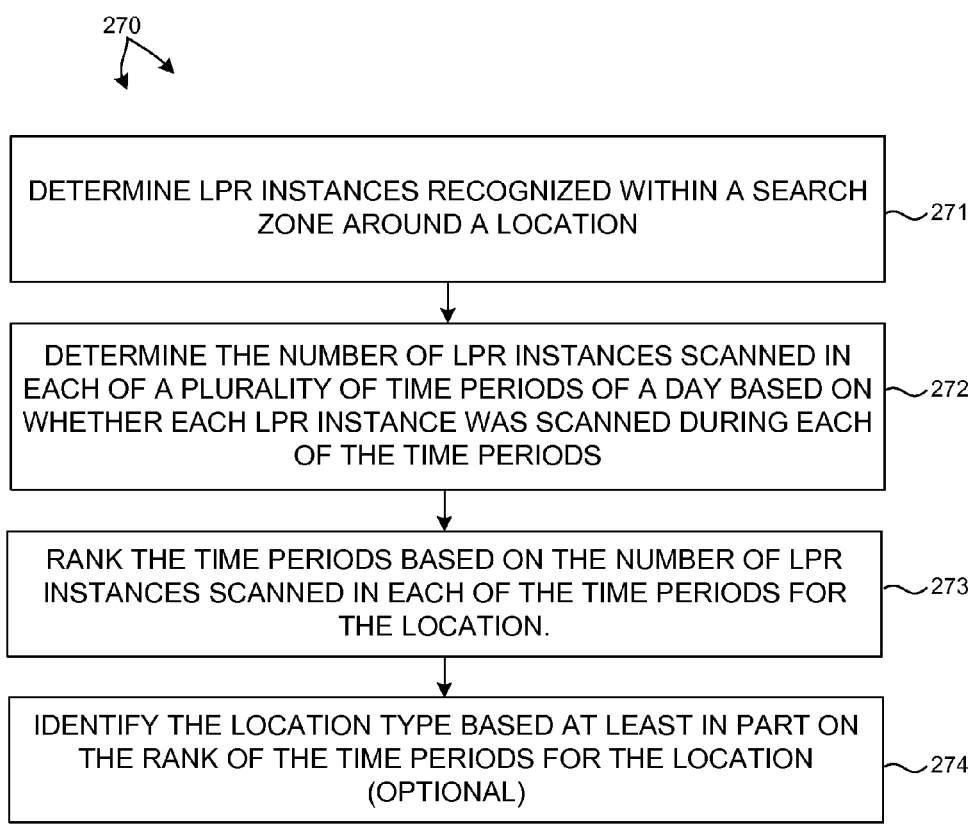
FIG. 14 is illustrative of a flowchart of a method 270 of generating an activity profile for a location.

FIG. 14 illustrates an exemplary method 270 of generating an activity profile for a location based on the time of day. In one example of block 271, LPR system 100 determines a number of LPR instances recognized within a search zone of a location. In block 272, LPR system 100 determines a number of the determined LPR instances that were scanned during each of a number of time periods of a twenty four hour day. For example, a twenty four hour day may be divided into twenty four, one-hour segments. LPR system 100 would determine the number of LPR instances scanned during each of the twenty four segments. In this manner, an activity profile is established for the location based on the typical hourly activity level at the location. In block 273, LPR system 100 ranks the time periods based on the number of LPR instances scanned in each of the time periods. Time periods with higher scores indicate a higher likelihood of locating a person of interest at that address location. In this manner, an LPR system can communicate to an entity (e.g., via LPR report 177) time periods with a higher likelihood of locating the person of interest at a particular location based on their ranking. Based on this information, an entity can focus its investigative efforts more efficiently.

In addition, LPR system 100 may identify the location type based at least in part on the ranking of the time periods for the location (block 274). For example, a location with a large number of LPR instances during the night, but very few during the day may be identified as a residential location.

Although method 270 is described with reference to time periods derived from a twenty four hour day, any other time duration may be contemplated. For example, time periods may be derived from a week long period (e.g., time periods are days of the week). In another example, time periods may be derived from a month long period (e.g., time periods are days of a month). Many other time periods subdivided from any specific time duration may be contemplated.

Figure 15:
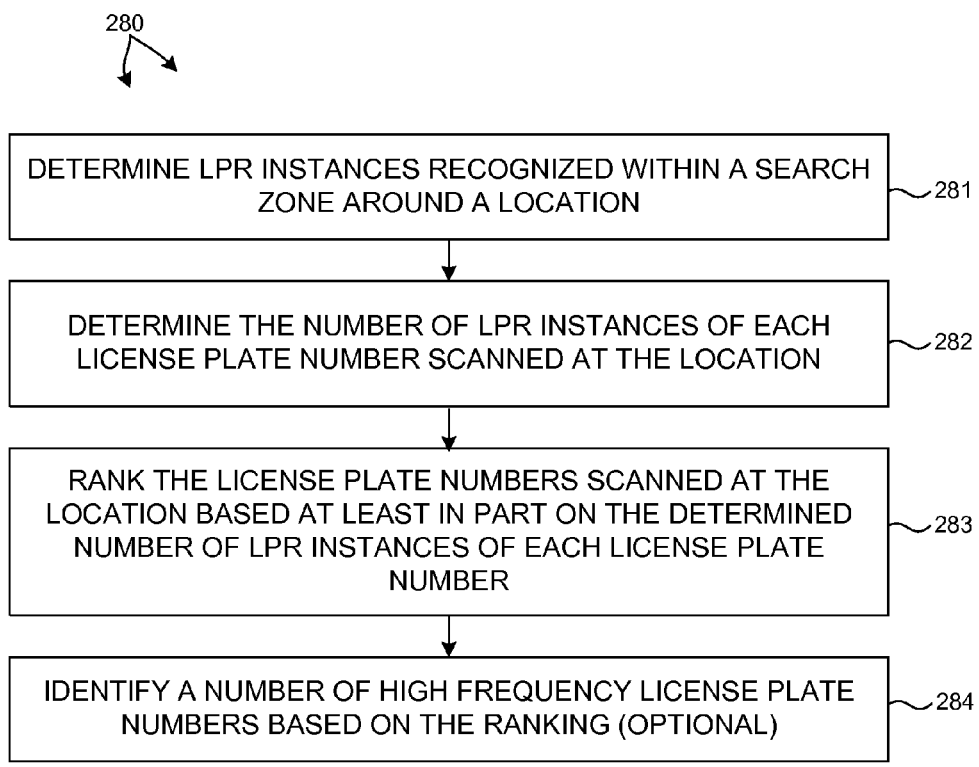
FIG. 15 is illustrative of a flowchart of a method 280 of ranking license plate numbers based on their repeated recognition at a location.

FIG. 15 illustrates an exemplary method 280 of ranking license plate numbers based on their repeated recognition at a particular location. In one example of block 281, LPR system 100 determines a number of LPR instances recognized within a search zone of a location. For example, LPR system 100 determines a number of LPR instances recognized within a search zone of a location over a time window that encompasses several LPR visits to the location. In block 272, LPR system 100 determines a number of LPR instances associated with each license plate number scanned at the location. In block 273, LPR system 100 ranks the license plate numbers scanned at the location based at least in part on the number of times they were scanned by the LPR system 100. In optional block 274, LPR system 100 identifies a number of high frequency license plate numbers based on their ranking. In this manner, an LPR system can communicate to an entity (e.g., via LPR report 177) license plate numbers with a higher likelihood of being located at a particular location based on their ranking. For example, a vehicle recognized at a location at every LPR visit for the past two years may be an abandoned car. Investigative effort may then be focused on verifying that the car is abandoned and initiate action for removal. In addition, method 270 may be applied to the same search zone and location to generate times of the day with the highest likelihood of locating the vehicle or person associated with a high frequency license plate number. Based on this information, an entity can focus its investigative efforts more efficiently.

Figure 16:
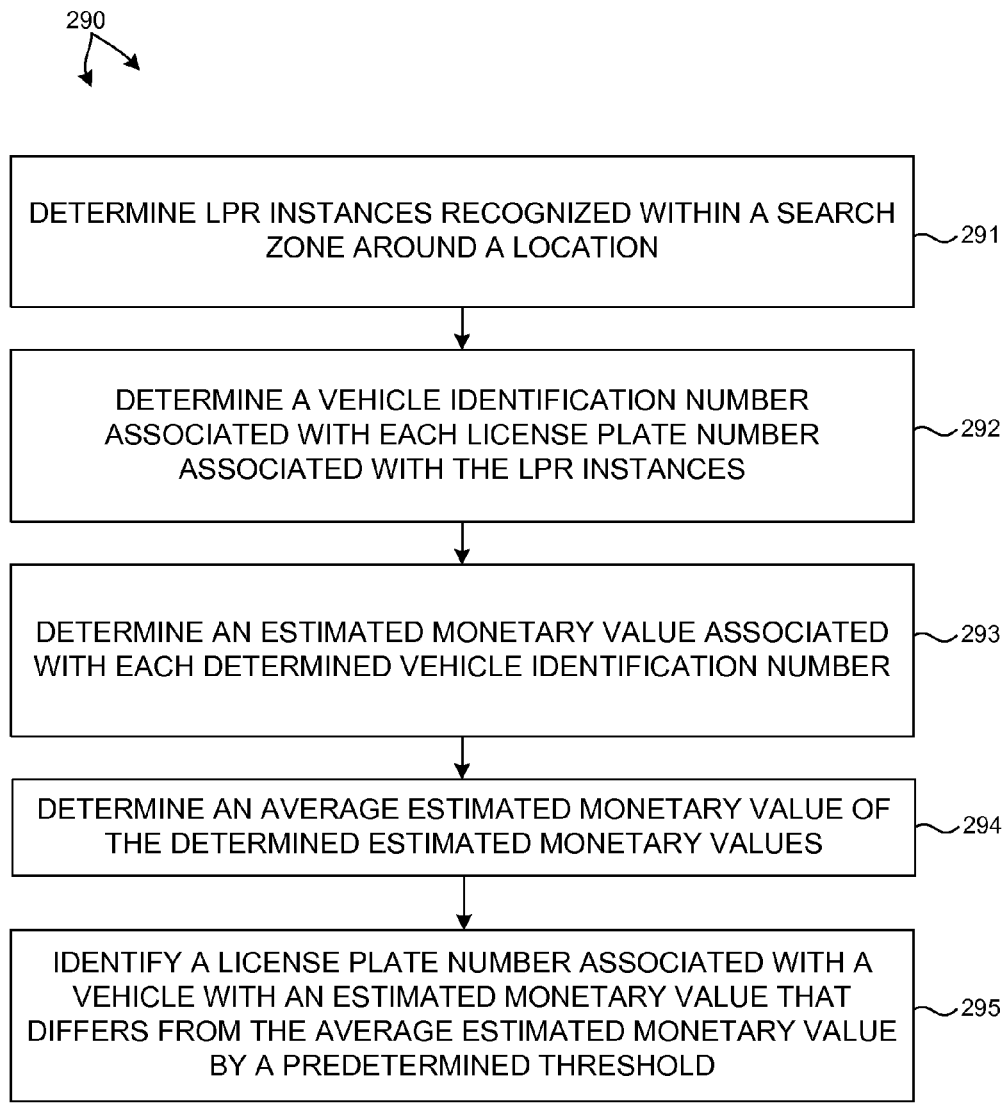
FIG. 16 is illustrative of a flowchart of a method 290 of ranking license plate numbers of vehicles at a particular location based on their relative value.

FIG. 16 illustrates an exemplary method 290 of ranking license plate numbers of vehicles at a particular location based on their relative value. In one example of block 291, LPR system 100 determines a number of LPR instances recognized within a search zone of a location. In block 292, LPR system 100 determines a vehicle identification number (VIN) associated with each license plate number associated with the LPR instances. In block 293, LPR system 100 determines an estimated monetary value associated with each VIN. In block 294, LPR system 100 determines an average estimated monetary value of the vehicles. In block 295, LPR system 100 identifies license plate numbers associated with vehicles with an estimated monetary value that differs from the average estimated monetary value by a predetermined threshold. For example, if an LPR system scans 75 license plates in an area surrounding an apartment complex and finds that the average value of the vehicles in the area is $15,000, yet one of the vehicles is worth only $500 and is always found in the same location, the car may be abandoned.

As discussed above, methods 200, 220, 230, 240, 250, 260, 270, 280, and 290 may be executed by POILPA tool 105 running within computer 110. An operator may interact with POILPA tool 105 via a locally delivered user interface (e.g., GUI displayed by terminal equipment directly connected to computer 110). In other embodiments, an operator may interact with POILPA tool 105 via a web interface communicated over the internet.

Figure 17:
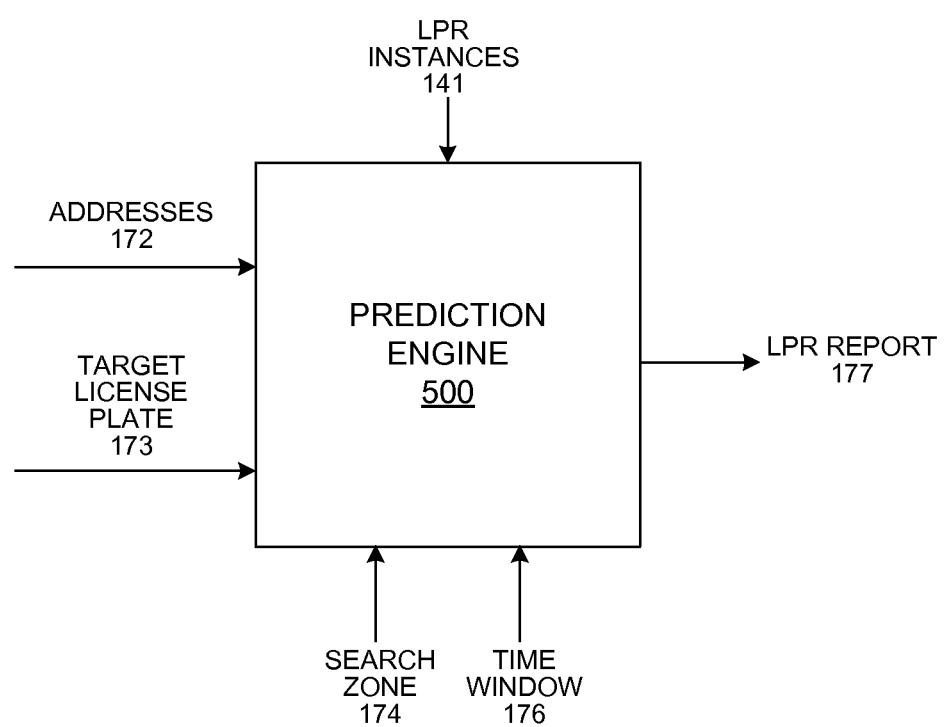
FIG. 17 illustrates a prediction engine 500 configured to implement POILPA functionality as discussed herein.

Although, methods 200, 220, 230, 240, 250, 260, 270, 280, and 290 may be executed by POILPA tool 105 running within computer 110, it may also be executed by dedicated hardware. FIG. 17 illustrates a prediction engine 500 configured to implement POILPA functionality as discussed herein. In one example, prediction engine 500 receives addresses 172, license plate numbers associated with a person of interest, and LPR instances 141 as input. Prediction engine 500 implements POILPA functionality as discussed herein and generates an LPR report 177 based on the probabilities associated with locating the person of interest at the address locations 172.

Although, aspects of methods 200, 220, 230, 240, 250, 260, 270, 280, and 290 are discussed with reference to determining LPR instances within search zones, in general, the same aspects may also involve determining LPR instances within any number of time windows.

Although, methods 200, 220, 230, 240, 250, 260, 270, 280, and 290 are introduced separately, any of these methods may be combined with any of the other methods to comprise POILPA functionality.

Methods 200, 220, 230, 240, 250, 260, 270, 280, and 290 may each involve communicating LPR information to an entity via LPR report 177. LPR report 177 may be in electronic form (e.g., spreadsheet file, text file, graphics file, etc.). In addition, methods 200, 220, 230, 240, 250, 260, 270, 280, and 290 may each involve receiving instructions from an entity. The instructions may be in electronic form (e.g., batch file, response to query, command input, etc.).

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD) floppy disk and blu-ray disc where disks usually reproduce data magnetically, while discs reproduce data optically with lasers. Combinations of the above should also be included within the scope of computer-readable media.

Although certain specific embodiments are described above for instructional purposes, the teachings of this patent document have general applicability and are not limited to the specific embodiments described above. Accordingly, various modifications, adaptations, and combinations of various features of the described embodiments can be practiced without departing from the scope of the invention as set forth in the claims.

What is claimed is:

1. A method comprising:
   receiving an indication of a license plate number of a vehicle associated with a person of interest;
   determining a plurality of LPR instances recognized within a search zone around any of a plurality of possible locations of the person of interest by one or more processors, wherein a possible location of the person of interest includes any of a location of an LPR instance that matches the license plate number and an address location associated with the person of interest;
   determining a distance between a location of each of a plurality of LPR instances matching a license plate number associated with a person of interest and each address associated with the person of interest;
   determining an average distance to the plurality of LPR instances for each address location; and
   ranking the plurality of possible locations of the person of interest based at least in part on a plurality of License Plate Recognition (LPR) instances that match the license plate number, wherein the ranking of the plurality of possible locations of the person of interest is based at least in part on the determined average distances for each address location.

2. The method of claim 1, further comprising:
   transmitting an indication of the license plate number to a LPR server; and
   receiving a plurality of LPR instances that match the license plate number.

3. The method of claim 2, wherein an LPR instance of the plurality of LPR instances includes an indication of a vehicle license plate number, an indication of a physical location, and an indication of a time when the LPR instance was captured by a LPR system.

4. The method of claim 1, further comprising:
   determining a number of LPR visits associated with each possible location of the person of interest, and wherein the ranking of the plurality of possible locations of the person of interest is based at least in part on the determined number of LPR visits to each location.

5. The method of claim 1, further comprising:
   determining a number of LPR instances that match the license plate number associated with a person of interest that are recognized within a first search zone around each of the possible locations of the person of interest, wherein the ranking of the plurality of possible locations is based at least in part on the determined number of LPR instances that match the license plate number associated with the person of interest within the first search zone.

6. The method of claim 5, further comprising:
   determining a number of LPR instances that match a license plate number associated with a person of interest that are recognized within a second search zone around each of the possible locations of the person of interest, wherein the ranking of the plurality of possible locations is based at least in part on a difference between the determined number of LPR instances that match the license plate number associated with the person of interest in the first search zone and the second search zone.

7. The method of claim 1, further comprising:
   determining a plurality of clusters of recognized LPR instances based on a visiting time period that an LPR unit collected LPR instances within the search zone.

8. The method of claim 7, further comprising:
   determining at least one attribute of each of the clusters, wherein the ranking of the plurality of possible locations of the person of interest is based at least in part on the at least one attribute of each of the clusters of License Plate Recognition (LPR) instances.

9. The method of claim 8, wherein the determining of the at least one attribute involves determining a number of the LPR instances recognized in each of a plurality of time periods of a day based on whether each LPR instance was scanned during each of the time periods, and wherein the ranking of the possible locations is based at least in part on the number of LPR instances scanned in each of the time periods.

10. The method of claim 9, further comprising:
    identifying a location type of at least one of the possible locations based at least in part on the number of LPR instances scanned in each of the time periods.

11. The method of claim 1, further comprising:
    determining a monetary value associated with a property at the address location, and wherein the ranking of the possible locations is based at least in part on the monetary value of the property at the address location.

12. The method of claim 1, further comprising
    determining whether the person of interest is subject to a live alert; and determining whether a relative likelihood of locating the person of interest at the location is greater than a predetermined threshold; and
    electronically communicating an indication of a location of the license plate number of the vehicle associated with the person of interest based on the ranking of the plurality of possible locations of the person of interest if the person of interest is subject to a live alert.

13. A method comprising:
    receiving a plurality of LPR instances that include a plurality of license plate numbers within a search zone around a location;
    ranking the plurality of license plate numbers based at least in part on an attribute of a vehicle associated with each of the plurality of license plate numbers by one or more processors, wherein the ranking involves:
    determining a vehicle identification number (VIN) associated with each license plate number of the plurality of license plate numbers;
    determining an estimated monetary value associated with each determined VIN;
    determining an average estimated monetary value based on the determined estimated monetary values; and
    identifying a license plate number associated with a vehicle with an estimated monetary value that differs from the average estimated monetary value by more than a threshold value.

14. An apparatus comprising:
    a processor; and
    a non-transitory computer readable medium storing an amount of program code that, when executed, causes the apparatus to
    receive an indication of a license plate number of a vehicle associated with a person of interest;
    determine a plurality of LPR instances recognized within a search zone around any of a plurality of possible locations of the person of interest, wherein a possible location of the person of interest includes any of a location of an LPR instance that matches the license plate number and an address location associated with the person of interest;
    determine a distance between a location of each of a plurality of LPR instances matching a license plate number associated with a person of interest and each address associated with the person of interest;
    determine an average distance to the plurality of LPR instances for each address location; and rank a plurality of possible locations of the person of interest based at least in part on a plurality of License Plate Recognition (LPR) instances that match the license plate number, wherein the ranking of the plurality of possible locations of the person of interest is based at least in part on the determined average distances for each address location.

15. The apparatus of claim 14, the non-transitory computer readable medium also storing an amount of program code that, when executed, causes the apparatus to transmit an indication of the license plate number to a LPR server; and
receive a plurality of LPR instances that match the license plate number.

16. The apparatus of claim 15, wherein an LPR instance of the plurality of LPR instances includes an indication of a vehicle license plate number, an indication of a physical location, and an indication of a time when the LPR instance was captured by a LPR system.

17. The apparatus of claim 14, the non-transitory computer readable medium also storing an amount of program code that, when executed,
causes the apparatus to
determine a number of LPR visits associated with each possible location of the person of interest, and wherein the ranking of the plurality of possible locations of the person of interest is based at least in part on the determined number of LPR visits to each location.

18. The apparatus of claim 14, the non-transitory computer readable medium also storing an amount of program code that, when executed, causes the apparatus to determine a number of LPR instances that match the license plate number associated with a person of interest that are recognized within a first search zone around each of the possible locations of the person of interest, wherein the ranking of the plurality of possible locations is based at least in part on the determined number of LPR instances that match the license plate number associated with the person of interest within the first search zone.

19. The apparatus of claim 18, the non-transitory computer readable medium also storing an amount of program code that, when executed, causes the apparatus to determine a number of LPR instances that match a license plate number associated with a person of interest that are recognized within a second search zone around each of the possible locations of the person of interest, wherein the ranking of the plurality of possible locations is based at least in part on a difference between the determined number of LPR instances that match the license plate number associated with the person of interest in the first search zone and the second search zone.

20. The apparatus of claim 14, the non-transitory computer readable medium also storing an amount of program code that, when executed, causes the apparatus to
determine a plurality of clusters of recognized LPR instances based on a visiting time period that an LPR unit collected LPR instances within the search zone.

21. The apparatus of claim 20, the non-transitory computer readable medium also storing an amount of program code that, when executed, causes the apparatus to determine at least one attribute of each of the clusters, wherein the ranking of the plurality of possible locations of the person of interest is based at least in part on the at least one attribute of each of the clusters of License Plate Recognition (LPR) instances.

22. The apparatus of claim 21, wherein the attribute includes a number of the LPR instances recognized in each of a plurality of time periods of a day based on whether each LPR instance was scanned during each of the time periods, and wherein the ranking of the possible locations is based at least in part on the number of LPR instances scanned in each of the time periods.

23. The apparatus of claim 14, the non-transitory computer readable medium also storing an amount of program code that, when executed, causes the apparatus to
determine a monetary value associated with a property at the address location, and wherein the ranking of the possible locations is based at least in part on the monetary value of the property at the address location.

24. The apparatus of claim 14, the non-transitory computer readable medium also storing an amount of program code that, when executed, causes the apparatus to
determine whether the person of interest is subject to a live alert; and
electronically communicate an indication of a location of the license plate number of the vehicle associated with the person of interest based on the ranking of the plurality of possible locations of the person of interest if the person of interest is subject to a live alert.

* * * * *